(12) United States Patent
Moy et al.

(10) Patent No.: US 11,681,301 B2
(45) Date of Patent: Jun. 20, 2023

(54) SYSTEM FOR A GUIDANCE INTERFACE FOR A VERTICAL TAKE-OFF AND LANDING AIRCRAFT

(71) Applicant: BETA AIR, LLC, South Burlington, VT (US)

(72) Inventors: Nicholas Moy, Burlington, VT (US); Collin Freiheit, Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/362,001

(22) Filed: Jun. 29, 2021

(65) Prior Publication Data
US 2022/0413514 A1    Dec. 29, 2022

(51) Int. Cl.
| | | |
|---|---|---|
| *G05D 1/10* | (2006.01) | |
| *G05D 1/00* | (2006.01) | |
| *B64C 39/02* | (2023.01) | |
| *G06T 19/00* | (2011.01) | |
| *B64U 30/20* | (2023.01) | |

(52) U.S. Cl.
CPC ........... *G05D 1/101* (2013.01); *B64C 39/024* (2013.01); *G05D 1/0044* (2013.01); *G06T 19/006* (2013.01); *B64U 30/20* (2023.01); *B64U 2201/20* (2023.01)

(58) Field of Classification Search
CPC ..................................................... G05D 1/101
See application file for complete search history.

(56) References Cited

U.S. PATENT DOCUMENTS

| | | |
|---|---|---|
| 6,272,404 B1 | 8/2001 | Amano |
| 9,043,106 B2 | 5/2015 | Ingram |
| (Continued) | | |

FOREIGN PATENT DOCUMENTS

| | | | | |
|---|---|---|---|---|
| EP | 3034812 A1 | * | 6/2016 | ................ F02C 3/10 |
| KR | 20210044671 A | * | 4/2021 | ........... B64C 39/024 |
| (Continued) | | | | |

OTHER PUBLICATIONS

Begli, Jasmin, Land¬ing on the deck of a ship—DLR continues its research into maritime helicopter missions, German Aerospace Center, (https://www.dlr.de/content/en/articles/news/2019/01/20190320_hedela-landing-on-the-deck-of-ship.html)(Mar. 2019).*

(Continued)

*Primary Examiner* — Jean Paul Cass
(74) *Attorney, Agent, or Firm* — Caldwell Intellectual Property Law

(57) ABSTRACT

In an aspect, a system for a guidance interface for a vertical take-off and landing (VTOL) aircraft comprises a plurality of flight components that are mechanically coupled to the VTOL aircraft. The VTOL aircraft also comprises an output device that is configured to present a display of the outside environment. The output device may overlay the display with a datum, a focal point, and a guidance symbol. The datum may be associated with the flight components of the VTOL aircraft. The focal point may be indicative of a desired landing location for the VTOL aircraft. The focal point may be determined by at least a predetermined flight plan. The guidance symbol may be a symbol that includes an optimal flight path to the focal point.

19 Claims, 7 Drawing Sheets

(56) References Cited

U.S. PATENT DOCUMENTS

| | | |
|---|---|---|
| 9,764,822 B2 | 9/2017 | Morrison |
| 9,881,022 B2 | 1/2018 | Ubhi |
| 10,134,298 B2 | 11/2018 | Tao |
| 10,737,780 B2 * | 8/2020 | Ismagilov ............... B64C 27/52 |
| 10,739,792 B2 | 8/2020 | Cherepinsky |
| 10,749,952 B2 * | 8/2020 | Charalambides .... G05D 1/1064 |
| 2005/0206533 A1 * | 9/2005 | Rogers ................... G01C 23/00 340/972 |
| 2010/0250022 A1 | 9/2010 | Hines |
| 2013/0147686 A1 * | 6/2013 | Clavin ................ G02B 27/017 345/8 |
| 2017/0334559 A1 * | 11/2017 | Bouffard ............. G08G 5/0069 |
| 2018/0109767 A1 | 4/2018 | Li |
| 2018/0267561 A1 | 9/2018 | Trench |
| 2019/0233077 A1 * | 8/2019 | Tian ........................ B64C 39/12 |
| 2019/0250601 A1 * | 8/2019 | Donahoe ............... B64C 39/024 |
| 2020/0073385 A1 | 3/2020 | Jobanputra |
| 2021/0142526 A1 * | 5/2021 | Mantyjarvi ....... B60W 50/0097 |
| 2021/0209388 A1 * | 7/2021 | Ciftci ..................... G06V 40/45 |

FOREIGN PATENT DOCUMENTS

| | | |
|---|---|---|
| WO | 2019116101 A1 | 6/2019 |
| WO | 2020012241 A1 | 1/2020 |
| WO | 2021046592 A1 | 3/2021 |

OTHER PUBLICATIONS

Begli, Jasmin, Land¬ing on the deck of a ship—DLR continues its research into maritime helicopter missions, German Aerospace Center, (https://www.dlr.de/content/en/articles/news/2019/01/20190320_hedela-landing-on-the-deck-of-ship.html)(Mar. 2019).*

Machine Translation of Korean Patent Application Pub. No. KR20210044671A to Amanda that was filed in 2019.*

Title: Using perspective guidance overlay to improve UAV manual control performance By: TADEMA Date: Apr. 27, 2007.

Title: The Ultimate DJI Go 4 Tutorial By: Stetson Doggett Date: Jan. 2020.

* cited by examiner

US 11,681,301 B2

SYSTEM FOR A GUIDANCE INTERFACE FOR A VERTICAL TAKE-OFF AND LANDING AIRCRAFT

FIELD OF THE INVENTION

The present invention generally relates to the field of aircraft. In particular, the present invention is directed to a system for a guidance interface for a vertical take-off and landing aircraft.

BACKGROUND

The VTOL aircraft and the technologies surrounding it promises a future of urban mobility in efficiency, clean energy, and mass transit. However, the VTOL industry is still in its developmental stages and the aircraft is still lacking in coherent navigation and accessibility for VTOL operators and pilots.

SUMMARY OF THE DISCLOSURE

In an aspect, a system for a guidance interface for a vertical take-off and landing (VTOL) aircraft includes a plurality of flight components that are mechanically coupled to the VTOL aircraft. The VTOL aircraft also comprises an output device that is configured to present a display of the outside environment. The output device may overlay the display with a datum, a focal point, and a guidance symbol. The datum may be associated with the flight components of the VTOL aircraft. The focal point may be indicative of a desired landing location for the VTOL aircraft. The focal point may be determined by at least a predetermined flight plan. The guidance symbol may be a symbol that includes an optimal flight path to the focal point.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
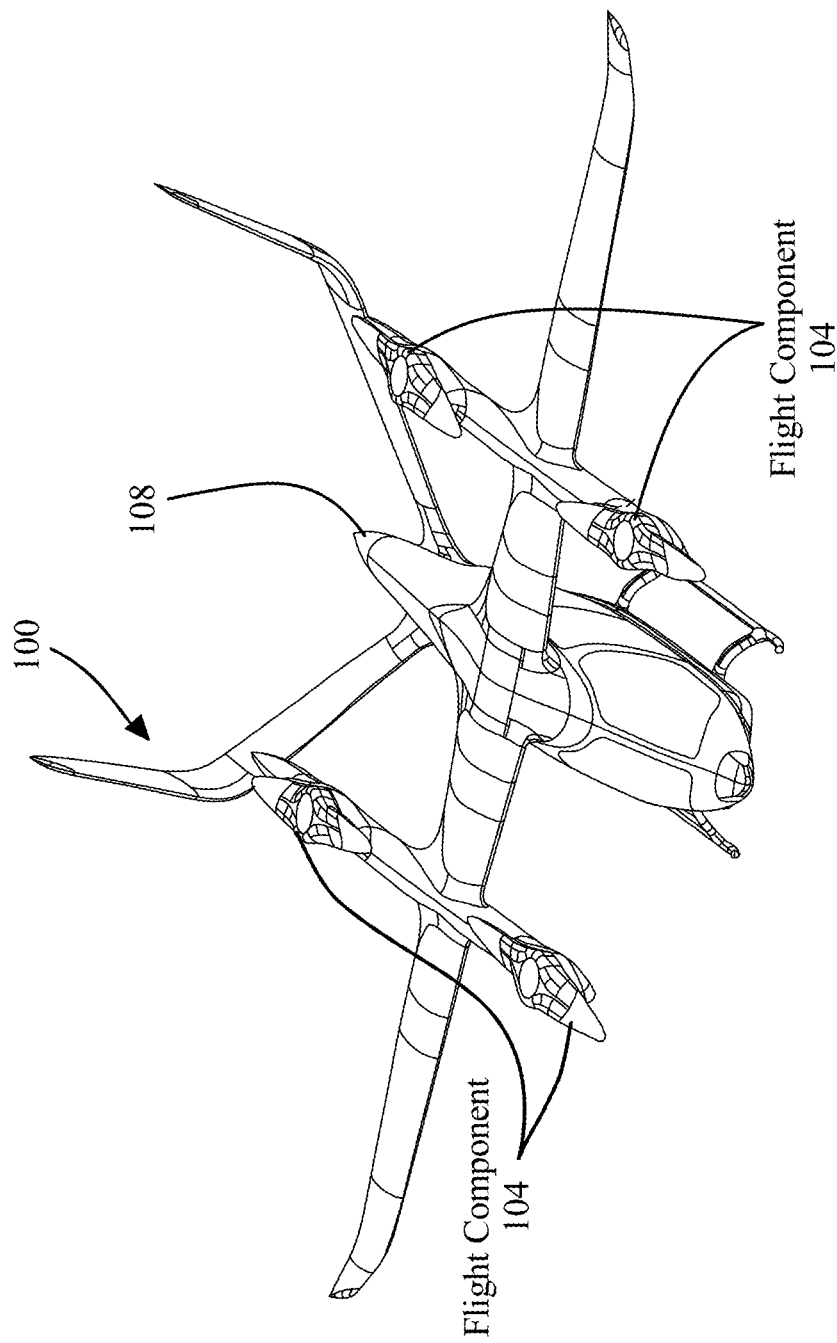
FIG. 1 is an illustration of an embodiment of a VTOL aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

At a high level, a disclosed guidance interface system for a vertical take-off and landing (VTOL) aircraft and its mechanically coupled flight components is disclosed. System may serve to provide a pilot with relevant and optimal information for navigation and guidance of the aircraft during flight. Guidance interface system includes an output device coupled to the VTOL aircraft; output device may include an output device that serves to present a display that may be live feed, window, and the like to capture an accurate representation of a dynamic outside environment. Output device also may include a flight controller configured to determine an optimal flight path automatically; flight controller may contribute to increased efficiency of aircraft for a pilot to view on display. A datum of flight components may be displayed in gauge or graph format or the like on display, which may display to a pilot torque outputs for each flight component and an optimal torque output the pilot may command to achieve an optimal flight path. An optimal flight path may protrude to a focal point as a guidance symbol. Embodiments of the information displayed on display may achieve safer, faster, and efficient flight of the VTOL aircraft.

Referring now to FIG. 1, an exemplary embodiment of a VTOL aircraft 100 is presented. 1VTOL aircraft 100 may include a vertical takeoff and landing aircraft (VTOL). As used herein, a "VTOL aircraft" is an aircraft that can hover, take off, and/or land vertically. VTOL aircraft may include an eVTOL aircraft, which as used herein is an electrically powered VTOL aircraft. In order to optimize power and energy necessary to propel VTOL aircraft, VTOL aircraft may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is a mode of flight where an aircraft is capable of flight using wings and/or foils that generate lift caused by the aircraft's forward airspeed and a shape of the wings and/or foils, such as airplane-style flight.

With continued reference to FIG. 1, a number of aerodynamic forces may act upon VTOL aircraft 100 during flight. Forces acting on VTOL aircraft 100 during flight may include, without limitation, thrust, defined as a forward force produced by a propulsor of the VTOL aircraft 100 that acts parallel to a longitudinal axis of the VTOL aircraft. Another force acting upon VTOL aircraft 100 may include, without limitation, drag, which may be defined as a rearward retarding force which is caused by disruption of airflow by any protruding surface of the VTOL aircraft 100 such as, without limitation, a wing, rotor, fuselage, or the like. Drag may oppose thrust and act rearward parallel to relative wind. A further force acting upon VTOL aircraft 100 may include, without limitation, weight, which may include a combined load of the VTOL aircraft 100 itself, crew, baggage, and/or fuel. Weight may pull VTOL aircraft 100 downward due to the force of gravity. An additional force acting on VTOL aircraft 100 may include, without limitation, lift, which may act to oppose a downward force of weight and may be produced by the dynamic effect of air acting on the airfoil and/or downward thrust from a propulsor of the VTOL aircraft. Lift generated by an airfoil may depend on speed of airflow, density of air, total area of an airfoil and/or segment thereof, and/or an angle of attack between air and the airfoil. For example, and without limitation, VTOL aircraft 100 may be designed to be as lightweight as possible. Reducing weight of an aircraft and designing to reduce the number of components is essential to optimize the weight. To save energy, it may be useful to reduce weight of components of a VTOL aircraft 100, including without limitation propulsors and/or propulsion assemblies.

Referring still to FIG. 1, aircraft may include at least a vertical propulsor 104 and at least a forward propulsor 108. A forward propulsor is a propulsor that propels the aircraft in a forward direction. Forward propulsors may be positioned for propelling an aircraft in a "forward" direction; forward propulsor may include one or more propulsors mounted on the front, on the wings, at the rear, or a combination of any such positions. Forward propulsor may propel an aircraft forward for fixed-wing and/or "airplane"-style flight, takeoff, and/or landing, and/or may propel the aircraft forward or backward on the ground. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 104 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 1, at least a forward propulsor 108 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 104 and at least a forward propulsor 108 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 1, during flight, a number of forces may act upon the VTOL aircraft. Forces acting on an aircraft 100 during flight may include thrust, the forward force produced by the rotating element of the aircraft 100 and acts parallel to the longitudinal axis. Drag may be defined as a rearward retarding force which is caused by disruption of airflow by any protruding surface of the aircraft 100 such as, without limitation, the wing, rotor, and fuselage. Drag may oppose thrust and acts rearward parallel to the relative wind. Another force acting on aircraft 100 may include weight, which may include a combined load of the aircraft 100 itself, crew, baggage and fuel. Weight may pull aircraft 100 downward due to the force of gravity. An additional force acting on aircraft 100 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

With continued reference to FIG. 1, at least a portion of a VTOL aircraft may include at least a propulsor. A propulsor, as used herein, is a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft is pushed forward. Propulsor may include any device or component that consumes electrical power on demand to propel a VTOL aircraft in a direction or other vehicle while on ground or in-flight.

With continued reference to FIG. 1, in an embodiment, at least a portion of the aircraft may include a propulsor, the propulsor may include a propeller, a blade, or any combination of the two. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates.

With continued reference to FIG. 1, in an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Computing device may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described herein. In an embodiment, propulsors may receive differential power consumption commands, such as a propeller or the like receiving command to generate greater power output owing a greater needed contribution to attitude control, or a wheel receiving a greater power output due to worse traction than another wheel under slippery conditions.

Figure 2:
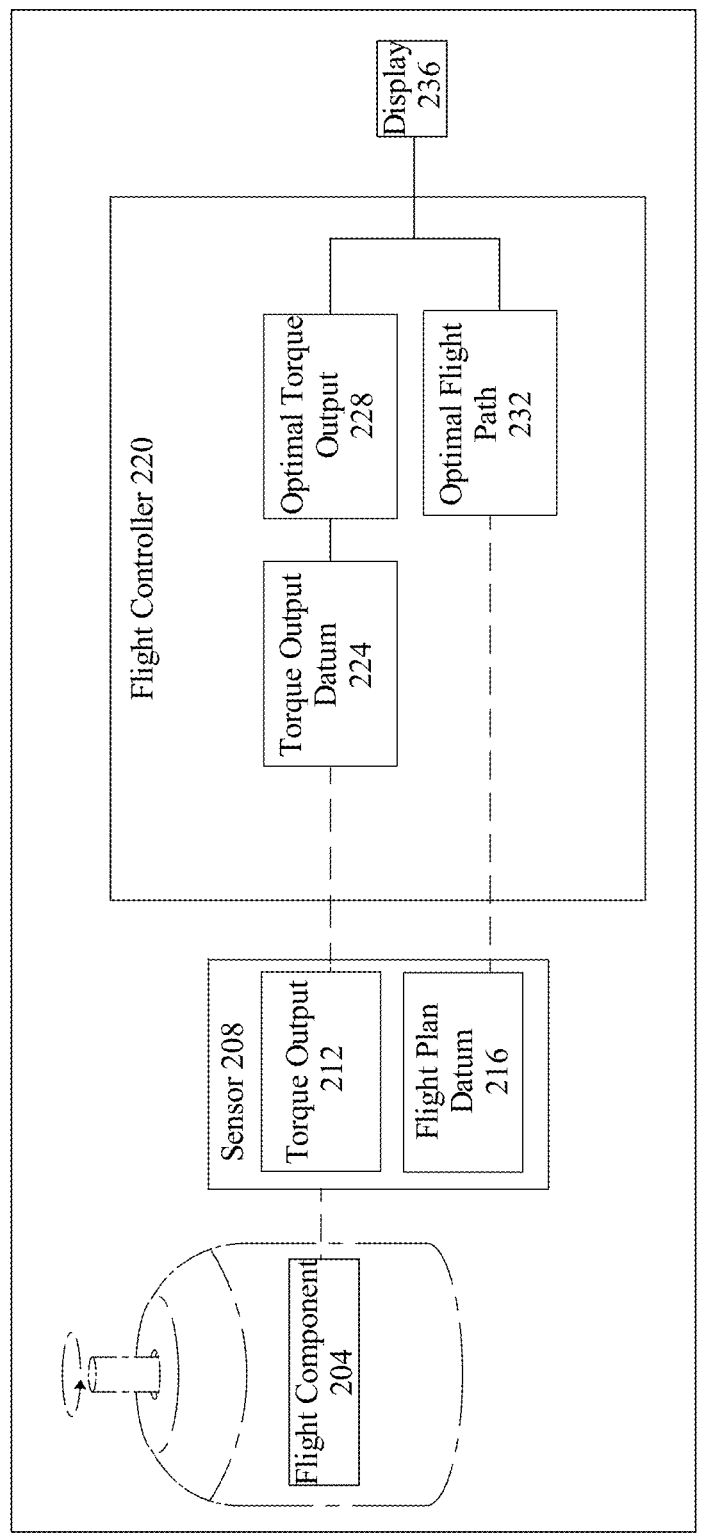
FIG. 2 is an illustrative embodiment of a system for capturing torque output and flight path configured for use in an aircraft in block diagram form.

Referring now to FIG. 2, an exemplary embodiment of a system 200 for a guidance interface for a VTOL aircraft is illustrated. System 200 includes flight component 204. Flight component 204 is configured to generate torque output 212 from information received by sensor 208. Flight component 204 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). Flight component 204 may further include, without limitation, a propulsor, a motor, a rudder, and the like. "Torque", for the purposes of this disclosure is the rotational equivalent of linear force. It may also be referred to as the moment, moment of force, rotational force or turning effect, depending on the field of study. Just as a linear force is a push or a pull, a torque can be thought of as a twist to an object around a specific axis. Another definition of torque is a product of a magnitude of a force and a perpendicular distance of a line of action of the force from an axis of rotation. In three dimensions, a torque is a pseudovector; for point particles, it is given by a cross product of a position vector (distance vector) and a force vector. A magnitude of torque of a rigid body depends on three quantities: a force applied, a lever arm vector connecting a point about which the torque is being measured to a point of force application, and an angle between the force and lever arm vectors.

Further referring to FIG. 2, flight component 204 may include an electrical machine that converts electrical energy into mechanical energy, such a motor. A motor 200 may include without limitation, any electric motor 200, where an electric motor 200 is a device that converts electrical energy into mechanical energy, for instance by causing a shaft 204 to rotate. A motor 200 may be driven by direct current (DC) electric power; for instance, a motor 200 may include a brushed DC motor 200 or the like. A motor 200 may be driven by electric power having varied or reversing voltage levels, such as alternating current (AC) power as produced by an alternating current generator and/or inverter 208, or otherwise varying power, such as produced by a switching power source. A motor 200 may include, without limitation, a brushless DC electric motor, a permanent magnet synchronous motor, a switched reluctance motor, and/or an induction motor. Most electric motors operate through the interaction between the motor's magnetic field and electric current in a wire winding to generate force in the form of torque applied on the motor's shaft. Electric motors can be powered by direct current (DC) sources, such as from batteries, motor vehicles or rectifiers, or by alternating current (AC) sources, such as a power grid, inverters or electrical generators. An electric generator is mechanically identical to an electric motor, but operates with a reversed flow of power, converting mechanical energy into electrical energy. Persons skilled in the art, upon reviewing the entirety of this disclosure, will be aware of various alternative or additional forms and/or configurations that a motor 200 may take or exemplify as consistent with this disclosure.

In an embodiment, flight component may include a propulsor, the propulsor may include a propeller, a blade, or any combination of the two. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates.

With continued reference to FIG. 2, system 200 includes sensor 208. Sensor 208 is configured to detect the output torque 212 produced by flight component 204. Sensor 208 is also configured to store a flight path datum 216. "Flight path datum", for the purposes of this disclosure, refers to a piece of data that represents a route, physical values, or combination thereof. In another non-limiting embodiment, sensor 208 may detect a plurality of routes and review them for use in later application consistent with this disclosure. Sensor 208 may be integrated into propulsor 204, a portion thereof, or any subcomponent thereof. Sensor 208 may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor 208 may include circuitry, computing devices, electronic components, or a combination thereof that translates into at least an electronic signal configured to be transmitted to another electronic component.

Sensor 208 generates torque output datum 224 and a predetermined flight plan. "Torque output datum", for the purposes of this disclosure, refers to a piece of data that represents a physical value, electrical value, or combination thereof. In a non-limiting embodiment, sensor 208 may detect the torque produced by propulsor 204 and translate that torque value into an electrical signal that represents that value for use in later processing or steps consistent with the entirety of this disclosure. The predetermined flight plan may be the optimal flight path 232. "Optimal flight path", for the purposes of this disclosure, refers to a piece of data that represents an airplane route that is safe, efficient, fast, or combination thereof. Flight controller may further be configured to generate a flight path towards a closest recharging pad when the controller detects the electric aircraft is low on power. In a non-limiting embodiment, an optimal flight path may include the path to a closest recharging pad. Sensors, as described herein, are any device, module, and/or subsystems, utilizing any hardware, software, and/or any combination thereof to detect events and/or changes in the instant environment and communicate the information to the vehicle controller. Sensor 208 may be mechanically and/or communicatively coupled, as described above, to the aircraft. Sensor 208 may include, a torque sensor, gyroscope, accelerometer, torque sensor, magnetometer, inertial measurement unit (IMU), pressure sensor, force sensor, proximity sensor, displacement sensor, vibration sensor, among others. Sensor 208 may include a video capture device, camera, optical device, among others. Sensor 208 may include a plurality of such devices. Sensor 208 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. As a further example a degree of torque may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 2, system 200 includes an optimal torque output 228. Flight controller 220 is configured to receive output torque datum 224 from torque output 212. The optimal torque output 228 is derived from the torque output datum 224. "Optimal torque output", for the purposes of this disclosure, refers to a piece of data that represents a physical value, electric value, or combination thereof in which the pilot may take to optimize flight. The optimal torque output may include the remaining vehicle torque of a flight component among a plurality of flight components. For instance and without limitation, remaining vehicle torque may be consistent with disclosure of remaining vehicle torque in U.S. patent application Ser. No. 17/197,427 and titled "SYSTEM AND METHOD FOR FLIGHT CONTROL IN ELECTRIC AIRCRAFT", which is incorporated herein by reference in its entirety. Remaining vehicle torque may include torque available at each of a plurality of flight components at any point during an aircraft's entire flight envelope, such as before, during, or after a maneuver. For example, and without limitation, torque output may indicate torque a flight component must output to accomplish a maneuver; remaining vehicle torque may then be calculated based on one or more of flight component limits, vehicle torque limits, environmental limits, or a combination thereof. Vehicle torque limit may include one or more elements of data representing maxima, minima, or other limits on vehicle torques, forces, attitudes, rates of change, or a combination thereof. Vehicle torque limit may include individual limits on one or more flight components, structural stress or strain, energy consumption limits, or a combination thereof. Remaining vehicle torque may be represented, as a non-limiting example, as a total torque available at an aircraft level, such as the remaining torque available in any plane of motion or attitude component such as pitch torque, roll torque, yaw torque, and/or lift torque "Flight controller", for the purposes of this disclosure, refers to a component or grouping of components that control trajectory of the electric aircraft by taking in signals from a pilot and output signals to at least a propulsor and other portions of the electric aircraft like control surfaces to adjust trajectory. Flight controller may mix, refine, adjust, redirect, combine, separate, or perform other types of signal operations to translate pilot desired trajectory into aircraft maneuvers. Flight controller 220 is also configured to generate the optimal flight path 232 from the flight path datum 216. Flight controller may determine the optimal flight path 232 automatically. Flight controller, for example, may take in torque output 212 from sensor 208, the signa may be sent to flight controller, which performs any number or combinations of operations on those signals, then sends out output signals to any number of aircraft components that work in tandem or independently to maneuver the aircraft in response to a pilot input. In a non-limiting embodiment, a pilot may send a pilot input at a press of a button to capture current states of the outside environment and subsystems of the electric aircraft to be displayed onto an output device in pilot view. The captured current state may further display a new focal point based on that captured current state. Flight controller may condition signals such that they can be sent and received by various components throughout the electric aircraft.

Additionally, flight controller may include and/or communicate with any computing device, including without limitation a microcontroller, microprocessor, digital signal processor (DSP) and/or system on a chip (SoC). Flight controller may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller may be designed and configured to operate electronic aircraft via fly-by-wire. Flight controller is communicatively coupled to each propulsor; as used herein, flight controller is communicatively coupled to each propulsor where flight controller is able to transmit signals to each propulsor and each propulsor is configured to modify an aspect of propulsor behavior in response to the signals. As a non-limiting example, flight controller may transmit signals to a propulsor via an electrical circuit connecting flight controller to the propulsor; the circuit may include a direct conductive path from flight controller to propulsor or may include an isolated coupling such as an optical or inductive coupling. Alternatively, or additionally, flight controller may communicate with a propulsor of plurality of propulsors 104a-n using wireless communication, such as without limitation communication performed using electromagnetic radiation including optical and/or radio communication, or communication via magnetic or capacitive coupling. Vehicle controller may be fully incorporated in an electric aircraft containing a propulsor and may be a remote device operating the electric aircraft remotely via wireless or radio signals, or may be a combination thereof, such as a computing device in the aircraft configured to perform some steps or actions described herein while a remote device is configured to perform other steps. Persons skilled in the art will be aware, after reviewing the entirety of this disclosure, of many different forms and protocols of communication that may be used to communicatively couple flight controller to propulsors. Persons skilled in the art, upon reviewing the entirety of this disclosure, will be aware of various ways to monitor resistance levels and apply resistance to linear thrust control, as used and described herein.

Flight controller 220 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Fall back flight control system 100 may include a single computing device operating independently, or may include two or more computing device operating in concert, in parallel, sequentially or the like; two or more computing devices may be included together in a single computing device or in two or more computing devices. Flight controller 220 may interface or communicate with one or more additional devices as described below in further detail via a network interface device. Network interface device may be utilized for connecting flight controller 220 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 220 may include but is not limited to, for example, a computing device or cluster of computing devices in a first location and a second computing device or cluster of computing devices in a second location. Fall back flight control system 200 may include one or more computing devices dedicated to data storage, security, distribution of traffic for load balancing, and the like. Flight controller 220 may distribute one or more computing tasks as described below across a plurality of computing devices of computing device, which may operate in parallel, in series, redundantly, or in any other manner used for distribution of tasks or memory between computing devices. Flight controller 220 may be implemented using a "shared nothing" architecture in which data is cached at the worker, in an embodiment, this may enable scalability of flight controller 220 and/or computing device.

Flight controller 220 may be designed and/or configured to perform any method, method step, or sequence of method steps in any embodiment described in this disclosure, in any order and with any degree of repetition. For instance, flight controller 220 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 220 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Flight controller 220, as well as any other component present within disclosed systems, as well as any other components or combination of components may be connected to a controller area network (CAN) which may interconnect all components for signal transmission and reception. Flight controller 220 may be configured to generate the optimal torque output 228 chosen from the torque output datum 224 as a function of the sensor 208. Torque output datum 224 may include an electrical signal consistent with the description of electrical signals regarding a plurality of torque outputs 212. Optimal torque output 232 includes an electrical signal configured to be transmitted to at least a portion of the aircraft, namely an actuator mechanically coupled to at least a portion of the aircraft that manipulates a fluid medium to change an aircraft's pitch, roll, yaw, or throttle.

With continued reference to FIG. 2, flight controller 220 is configured to determine the optimal torque output 228 and the optimal flight path 232 to pilot, user, personnel, support staff, artificial intelligence, or the like and communicate that information to an outside device such as display 236. The display may comprise an output device. "Output device", for the purposes of this disclosure, refers to a visual apparatus that is comprised of compact flat panel designs, liquid crystal display, organic light-emitting diode, or combination thereof to present visual information superimposed on spaces. Display 236 may include a graphical user interface (GUI), multi-functional display (MFD), primary flight display (PFD), gages, dials, screens, touch screens, speakers, haptic feedback device, live feed, window, combination thereof, or another display type not listed here. In a non-limiting embodiment, display 236 may include a mobile computing device like a smartphone, tablet, computer, laptop, client device, server, a combination thereof, or another undisclosed display alone or in combination. Display 236 may be disposed in at least a portion of a cockpit of an electric aircraft. Display 236 may be a heads-up display (HUD) disposed in goggles, glasses, eye screen, or other headwear a pilot or user may be wearing. Display 236 may include augmented reality, virtual reality, or combination thereof.

Figure 3:
FIG. 3 is a schematic diagram of an embodiment of an output device.

Now referring to FIG. 3, system includes an output device 304. Output device 304 may include monitor display that may display information in pictorial form. Monitor display may include visual display, computer, and the like. For example, monitors display may be built using liquid crystal display technology that displays to the pilot information from a computer's user interface. Output device may include any processor and/or computing device containing any processor suitable for use in and/or with augmented reality device 104 as described above. Output device may include any component and/or element suitable for use with augmented reality over-head display. The display may further include at least a peripheral display. The peripheral display may further be mounted to a pilot's head that is in the peripheral of the user's field of view. In a non-limiting embodiment, the pilot interface may view the outside environment as a function of the sensors and flight controller and generate a focal point as a dot on the at least peripheral display. Output device may be designed and/or configured to perform any method, method step, or sequence of method steps in any embodiment described in this disclosure, in any order and with any degree of repetition. For instance, output device 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Output device 304 may perform any step or sequence of steps as described in this disclosure in parallel, such as simultaneously and/or substantially simultaneously performing a step two or more times using two or more parallel threads, output device 304 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. The output device 304

With continued reference to FIG. 3, the output device 304 displays the flight component datums 312. "Flight components datum", for the purposes of this disclosure, refer to a physical value, electronic value, or combination thereof that represents any metric associated with the flight component such as, desired torque output, actual torque output, RPM, life remaining, and the like. The flight components datum 312 may be displayed in a gauge format, graph format, and the like. Flight component datum 312 may further include a number representing the velocity of the electric aircraft in flight that may be displayed onto the output device. For example, the flight components datum 312 may display the torque output datum in a noticeable but non-distracting position on the output device 304 and highlight the optimal torque output the pilot may command to achieve optimal flight path.

With continued reference to FIG. 3, the output device 304 displays a focal point 316 that indicates the desired landing location for the VTOL aircraft. "Focal point", for the purposes of this disclosure, refers to a piece of data that represents an electronic symbol that is trailed by a guidance symbol 320 representing the optimal flight path. The focal point 316 may be determined by at least a predetermined flight plan. "Guidance symbol", for the purposes of this disclosure, refers to a pattern, indicium, or array of symbols indicating a direction or position to be traversed by a vehicle on the way to the desired location indicated by the focal point 316. For example, the pilot may follow the flight path the guidance symbol 320 is protruding to the desired location indicated by the focal point 316. The output device 304 may display an estimated time of arrival 308 that may alter during the course of a flight for the VTOL aircraft to arrive at the focal point 316. The estimated time of arrival 308 may comprise at least a digital clock.

With continued reference to FIG. 3, the output device 304 may display at least a warning symbol to the pilot. The warning symbol 332 may include an abbreviation, a sign, or combination thereof. The warning symbol 332 may highlight itself in blinking form, different colors, or combination thereof. Examples of warning symbols may indicate, but not limited to, a malfunction or failure of at least a flight component, flight controller, software relating to generating focal point 316 or guidance symbol 320, unfavorable landing location, and the like. The warning symbol 332 or plurality of warning symbols may dissuade the pilot from undertaking a disadvantageous action. Examples of disadvantageous actions include, but not limited to, at least actions that may harm the VTOL aircraft or flight components, actions that may hard the pilot, actions that may produce collateral damage, and the like. The output device 304 may display a status symbol of the landing of the VTOL aircraft. The status symbol may comprise a status of landing zone 324. "Status of landing zone", for the purposes of this disclosure, refers to a piece of data that represents a physical symbol, electronic symbol, or combination thereof. The status of landing zone 324 may include an abbreviation, sign, or combination thereof. For example, the status of landing zone 324 may inform the pilot at least within a proximity of the focal point 304 that the landing zone predetermined by the focal point 316 is at least valid if the VTOL aircraft is cleared to land safely or invalid if the VTOL aircraft is not cleared to land. The flight mode symbol 328 may be displayed on the output device 304. The flight mode symbol 328 may be determined by a feedback loop that may include a process whereby a pilot takes some action, causing flight components to respond; system may sense or recalculating one or more of the data described above, and then update the display. As described above, aircraft may be moving in a given direction on a path to a destination, and flight controller may update the path; update may be based on a torque output as function of a sensor, new aircraft position, velocity or acceleration vectors, or a combination thereof. Feedback loop may further include an updated optimal torque output that is based on a new path, new torque output as a function of a sensor, or combination thereof. Flight symbol 328 that may include a feedback loop may further include a change depending on how the accurately the aircraft or pilot is complying with recommendations in the previous iteration of the display. For example, output device 304 may display feedback loop in a form of the aircraft's actual or currently projected path along with a recommended one. Output device 304 may further display feedback loop with a new optimal torque output and an actual torque output. In a non-limiting embodiment, the flight controller may command a sensor which may include at least an IMU and configure it to be a closed-loop accelerometer in the instances of flight disturbances. In a non-limiting embodiment, a pilot may command aircraft to achieve a new optimal torque based on information that is displayed on output device 304. New optimal torque may be updated based on detections captured by a sensor and the like. A further example may include the use of colors that may include, but not limited to, a red color that may be used if the pilot and/or aircraft is pursuing a course that is not the recommended one.

Figure 4:
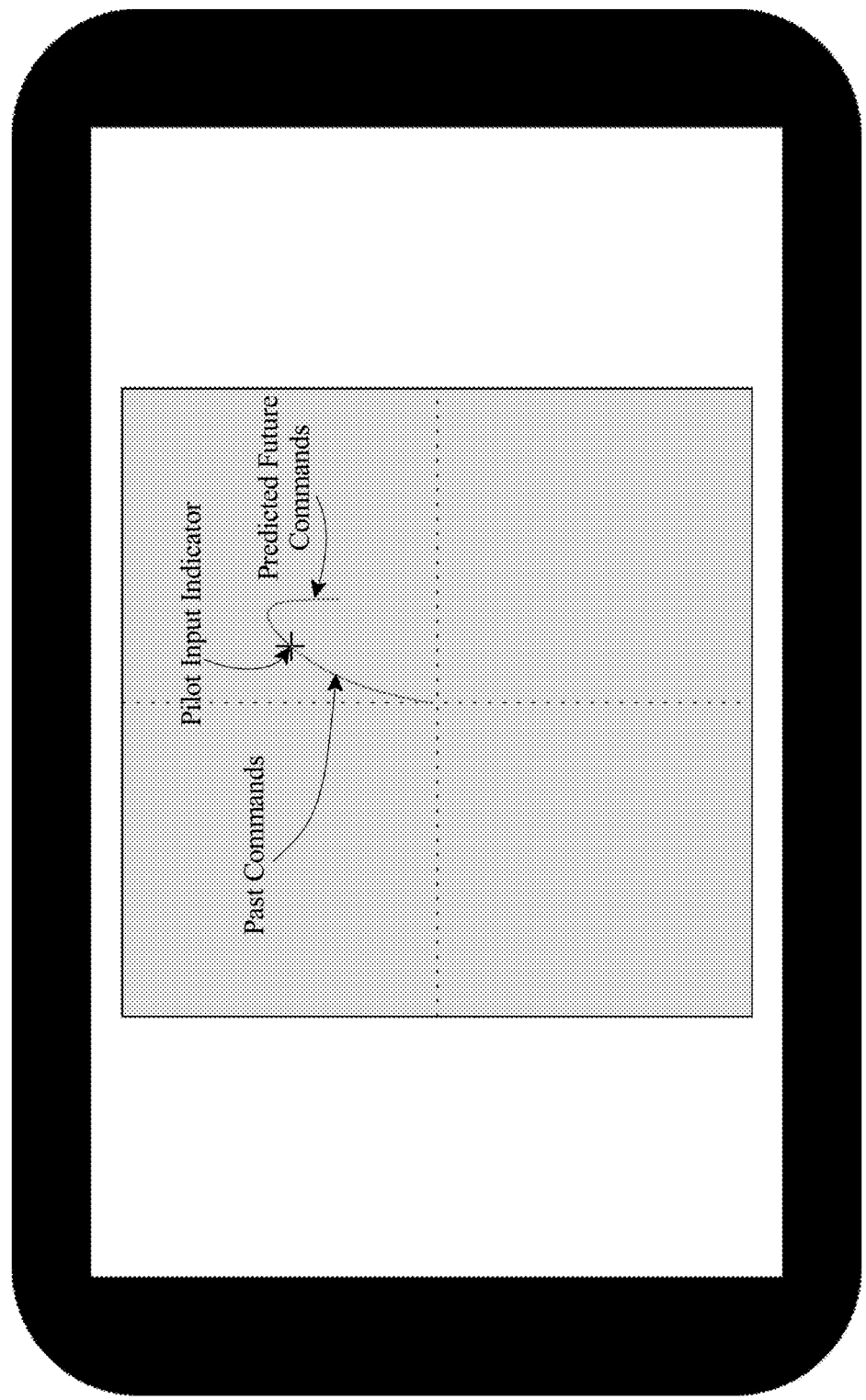
FIG. 4 is a representative screenshot depicting one aspect of an exemplary output device implemented in accordance with aspects of the invention.

Now with reference to FIG. 4, an exemplary screenshot of displaying, at the output device that may include a GUI. As described above, GUI may display the current flight plan and/or optimal flight path in graphical form. Graphical form may include a two-dimensional plot of two variables that represent data received by the controller, such as past maneuvers and predicted future maneuvers. In one embodiment, GUI may also display the user's input in real-time. The GUI may further include to display the velocity and position of the electric aircraft based on provided future inputs. In another embodiment, GUI may display the maneuver that was just performed by the user, the suggested maneuver to be performed and the maneuver being currently performed by the user. In one embodiment, GUI will display a different suggested maneuver upon deviation by the user from flight plan. In a non-limiting example, GUI may display different color schemes for immediate past maneuver, suggested immediate future maneuver, and the like.

Figure 5:
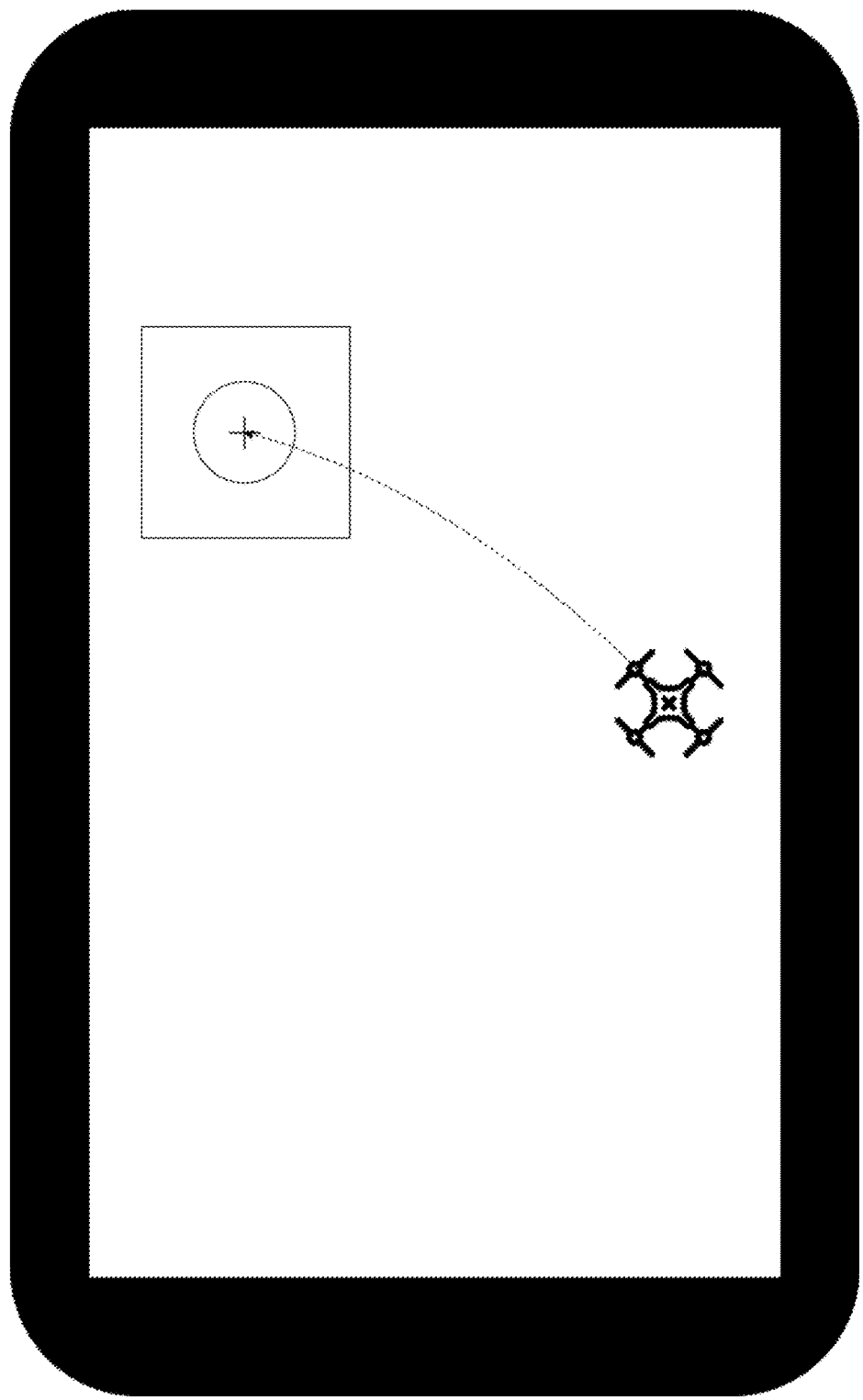
FIG. 5 is a representative screenshot depicting another aspect of an exemplary output device implemented in accordance with aspects of the invention.

Now referring to FIG. 5, another exemplary screenshot of displaying at the GUI. In one embodiment, additionally to the flight plan, GUI may display objective and a directional line once objective is nearby. In one embodiment, GUI may display a directional path to the objective when flight plan is set for an intermediate objective. In a nonlimiting example, GUI may display a dotted path additionally to the suggested maneuvers and a graphical representation of the objective one user gets near the objective as to assist user when landing or reaching objective. In another nonlimiting example, GUI may display a dotted line connected to the final objective as to keep user informed of direction of final objective when flight plan is set for an intermediate objective.

Figure 6:
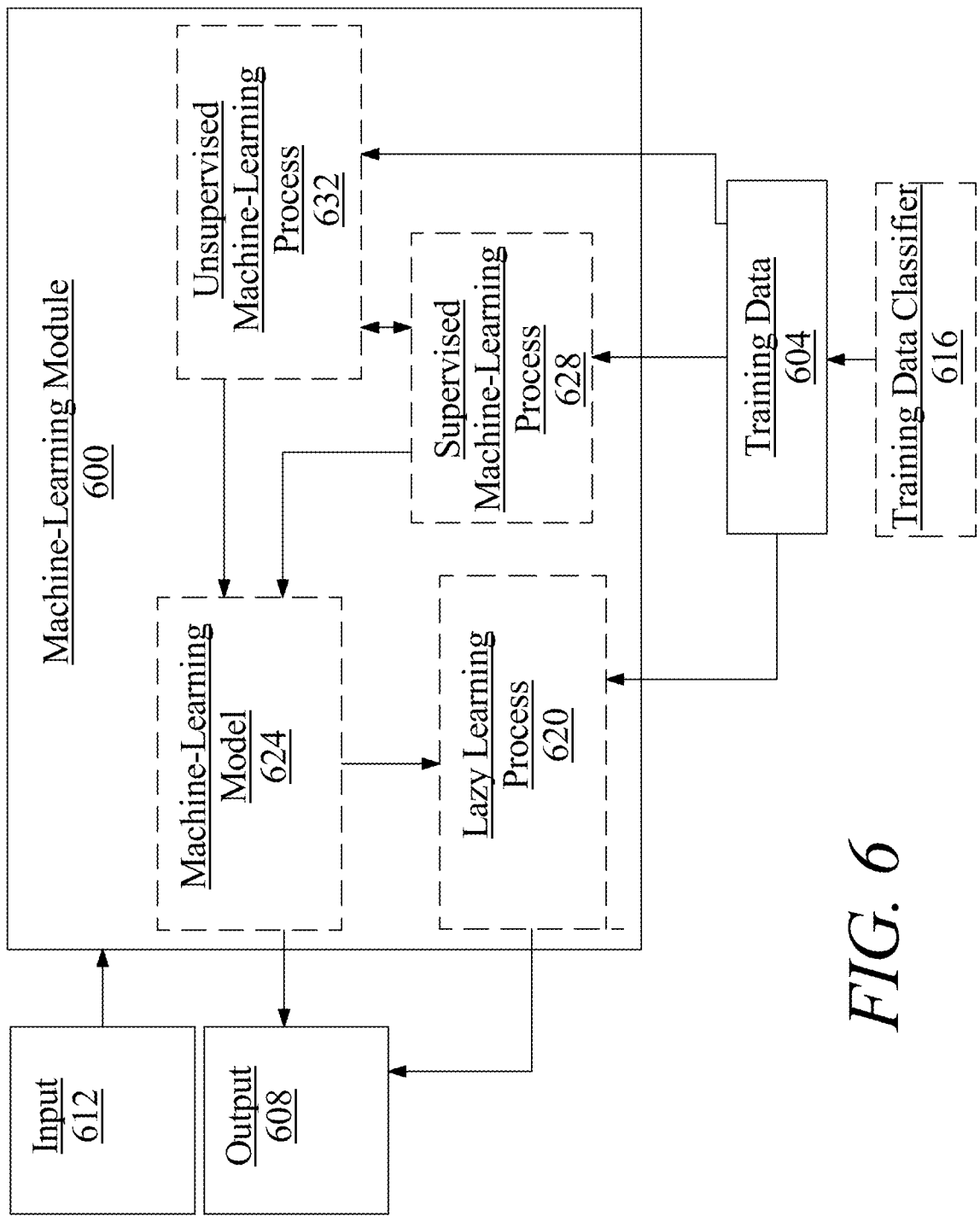
FIG. 6 is a block diagram illustrating an exemplary embodiment of a machine-learning process.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative, at least a flight path datum as an input that generates the optimal flight path as the output presented as a guidance symbol and a focal point.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include torque output datum as described above as inputs, optimal torque output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 7:
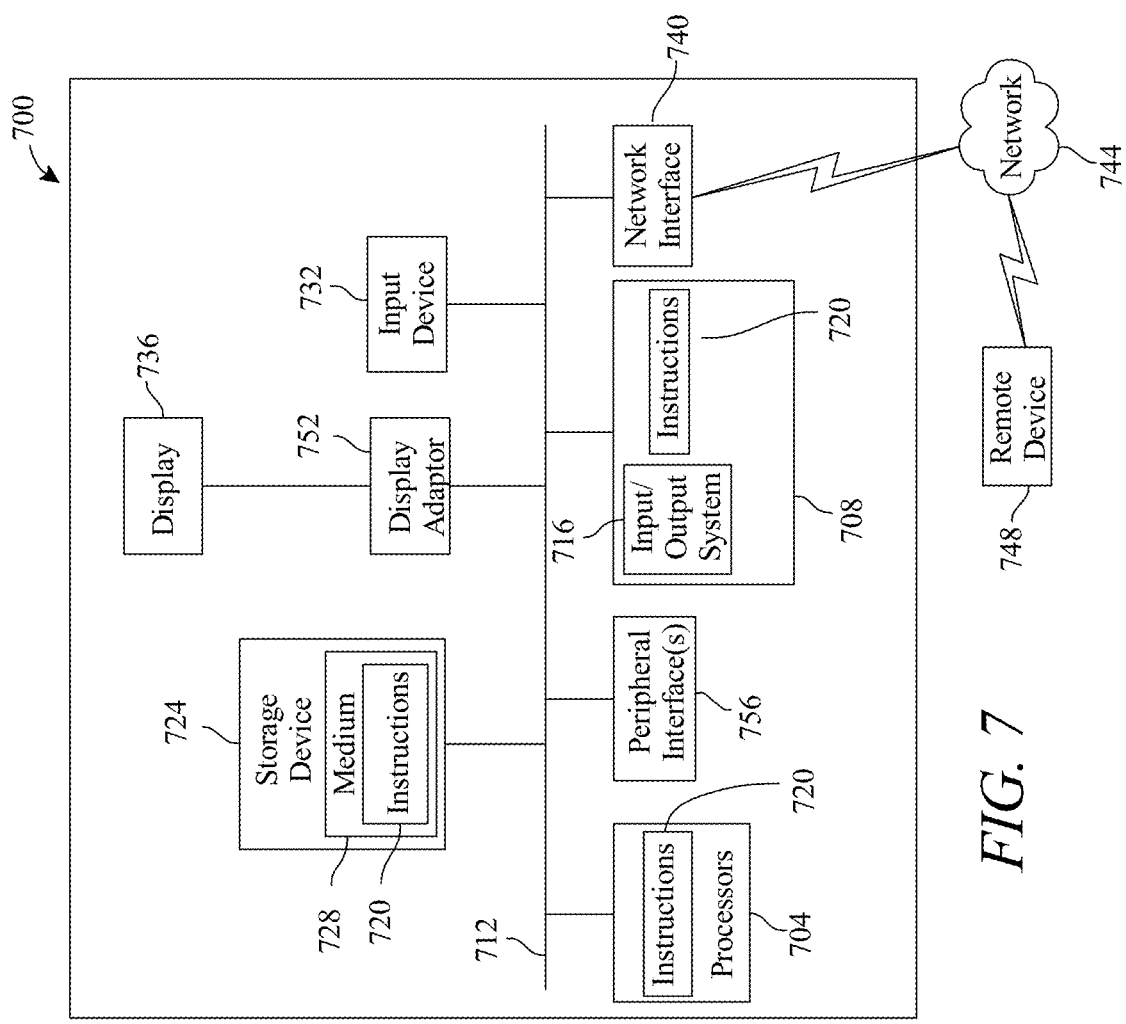
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

System includes a computing device. computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device may include a single computing device operating independently, or may include two or more computing device operating in concert, in parallel, sequentially or the like; two or more computing devices may be included together in a single computing device or in two or more computing devices. computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device may include but is not limited to, for example, a computing device or cluster of computing devices in a first location and a second computing device or cluster of computing devices in a second location. computing device may include one or more computing devices dedicated to data storage, security, distribution of traffic for load balancing, and the like. computing device may distribute one or more computing tasks as described below across a plurality of computing devices of computing device, which may operate in parallel, in series, redundantly, or in any other manner used for distribution of tasks or memory between computing devices. computing device may be implemented using a "shared nothing" architecture in which data is cached at the worker, in an embodiment, this may enable scalability of system 100 and/or computing device.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for a guidance interface for an electric vertical take-off and landing (eVTOL) aircraft comprising:
   a plurality of flight components mechanically coupled to the eVTOL aircraft;
   a flight controller locatable within the eVTOL aircraft configured to generate an optimal flight path, wherein generating the optimal flight path comprises:
      selecting a training data set correlating flight path data and optimal flight path data; and
      using a machine-learning process to generate the optimal flight path as a function of the training data set and a flight path datum; and
   an output device comprising a heads-up display (HUD) of a headwear of a pilot, wherein the output device is integrated within the eVTOL aircraft, wherein the output device is configured to present, to a pilot within the eVTOL aircraft, a display of the outside environment and to overlay the display with:
      a flight components datum including information on in-flight performance of a flight component of the plurality of flight components, wherein the flight component comprises a propulsor of the eVTOL aircraft;
      a focal point indicating the desired landing location for the eVTOL aircraft as determined by at least a predetermined flight plan; and
      a guidance symbol, the guidance symbol including:
         the optimal flight path to the focal point for the pilot to follow; and
         a suggested maneuver for the pilot to take upon deviation from a flight plan.

2. The system of claim 1, wherein each flight component is configured to produce torque.

3. The system of claim 1, wherein the display is one or more of a live feed or a window.

4. The system of claim 1, wherein at least a sensor is configured to detect each of a torque output datum and a flight path datum.

5. The system of claim 1, wherein the output device comprises an augmented reality display.

6. The system of claim 4, further comprising a flight controller configured to determine the optimal flight path as a function of the predetermined flight plan and the flight path datum.

7. The system of claim 6, wherein the optimal fight path is displayed on the output device.

8. The system of claim 4, further comprising a flight controller configured to determine an optimal torque output as a function of the torque output datum, wherein the flight component comprises at least a motor, and wherein the at least a sensor is further configured to detect the torque output datum as a function of electromotive force (EMF) associated with the at least a motor.

9. The system of claim 8, wherein a torque output of a flight component of the plurality of flight components having a highest remaining torque output is the optimal torque output.

10. The system of claim 9, wherein the optimal torque output is displayed on the output device.

11. The system of claim 6, wherein the flight controller determines the optimal flight path automatically.

12. The system of claim 1, wherein a predetermined flight plan is the optimal flight plan.

13. The system of claim 1, wherein the optimal flight plan is selected by a flight controller.

14. The system of claim 5, wherein the augmented reality display displays at least a blinking warning symbol to the pilot.

15. The system of claim 14, wherein the blinking warning symbol is configured to inform the pilot of failure to locate the focal point for desired landing location for the eVTOL aircraft.

16. The system of claim 5, wherein the augmented reality display displays an estimated time of arrival to the focal point.

17. The system of claim 5, wherein the augmented reality display displays a status of the landing location with signs indicating a safe or dangerous landing location.

18. The system of claim 5, where the augmented reality display displays signs indicating available flight modes for the eVTOL aircraft in the proximity of the focal point; and wherein the available flight modes include fixed-wing flight and hover flight.

19. The system of claim 1, wherein the flight components datum is displayed in one or more of a gauge format or a graph format.

* * * * *